Patented Apr. 13, 1954

2,675,300

UNITED STATES PATENT OFFICE 2,675,300

HYDRAZINE MANUFACTURE

John F. Haller, Niagara Falls, N. Y., assignor to Mathieson Chemical Corporation, a corporation of West Virginia No Drawing. Application April 10, 1950,
Serial No. 155,122

3 Claims. (Cl. 23—190)

My invention relates to the manufacture of hydrazine by direct reaction of chlorine and ammonia gases in the presence of activated alumina. Present commercial manufacture of hydrazine depends upon application of the Raschig process which requires reaction of caustic soda and chlorine to sodium hypochlorite, oxidation of the ammonia by the hypochlorite to chloramine and reduction of the chloramine with excess ammonia to hydrazine. The product is produced in highly diluted form, e. g. about 1 to 1.5 per cent, in aqueous admixture. Expensive concentrating and separating steps to remove excess ammonia, salt and water are required to recover a product containing about 85 per cent hydrazine hydrate. The 85 per cent hydrate must be chemically treated in further expensive dehydrating steps as by acid absorption and ammonolysis of the resulting salts to produce hydrazine in suitable commercial anhydrous form. Obviously, direct reaction of chlorine and ammonia to produce hydrazine would be an attractive possibility in reducing the cost and complexity of processing, particularly, if the product could be directly recovered in anhydrous form. It is well known, however, that the reaction of chlorine and ammonia is difficult to control and proceeds with great rapidity to form nitrogen trichloride with consequent danger of violent explosion. For this reason, apparently, production of hydrazine by direct reaction of chlorine and ammonia has not been considered a commercial possibility. I have discovered, however, that the reaction proceeds smoothly and almost quantitatively when conducted stepwise on an adsorptive surface such as activated alumina so that one reactant is adsorbed on the adsorptive surface before contact with the second reactant.

According to my invention, the activated alumina may be exposed alternately to the action of chlorine gas and ammonia gas, and hydrazine hydrochloride is removed as a product from the adsorbent upon completion of the reaction by desorption. The process proceeds stepwise, namely by the first adsorption of chlorine or ammonia on the adsorbent followed by the adsorption and reaction of the other of the two gases after the excess of the first has been removed by gaseous displacement. It appears to be immaterial which of the two gases is adsorbed first on the alumina since equally good yields of hydrazine are obtained by either mode of procedure. An excess of chlorine is to be avoided when it is the second gas passed over the adsorbent.

I have been unable to ascertain as yet whether the alumina functions catalytically in promoting and directing the hydrazine reaction or whether the mechanism of stepwise adsorption merely fixes the reactants and primary product against further reaction. In any event the reaction proceeds smoothly, and the process requires no difficult means of control. The solid surface also appears to assist reaction control by taking up the heat of reaction so that decomposition and formation of nitrogen trichloride is avoided.

In the alternate gas contact method, either or both of the gases may be diluted with an inert gas, e. g. air or nitrogen, if desired, to facilitate control of the release of the heat of adsorption. The desorption of the adsorbed product from the surface of the alumina may be accomplished by any suitable means. For example, the adsorbent may be washed with water or other aqueous medium such as dilute acid or alkali to obtain the hydrazine as an aqueous solution which is separated from the alumina by filtration or decantation. It is advantageous of course to dry and reactivate the alumina by heating for recycle to the first adsorption step. Most advantageously, however, anhydrous hydrazine is obtained by displacing the adsorbed product from the surface of the adsorbent by heating the latter in a stream of a suitable gas. Ammonia is particularly desirable for this purpose since the anhydrous hydrazine may be obtained by condensing the entire mixture and fractionating excess ammonia from the residual hydrazine. By-product ammonium chloride is removed from the adsorbent during reactivation.

The activated alumina and reactants may be handled in a variety of ways. Granular alumina is conveniently handled as a fixed bed exposed to alternate cycles of reactant and purge gas streams. For example, a fixed bed of alumina is chlorinated or ammoniated, the gas phase is purged from the reactor by means of an inert gas, e. g. air or nitrogen, and the other of the two reactant gases is introduced and is subsequently purged. Alternatively, granular alumina may be handled with a moving bed technique in which a slowly descending alumina bed is subjected stepwise to the action of the gas feed. The contacting may be effected in separate reactors or in a single reactor by introducing and discharging the reactants at different levels separated by purge zones. The contact advantageously is countercurrent. Finely divided activated alumina may be handled in a suspension system or advantageously at higher proportions of solid to gas according to the fluidized solids technique.

The solid-gas mixture may be passed, for example, through a system of serially connected reaction tubes and separating chambers; e. g. of the cyclone type. If increased adsorption time factor or increased separating and cooling time is desired, large settler-reactor chambers may be employed in conjunction with the mixing and reaction tubes. Alternatively, according to a fluidized bed procedure, the alumina may be suspended in a reaction chamber in air, nitrogen or other inert gas. A suitable proportion of chlorine or ammonia is then introduced into the air stream from which it is adsorbed on the alumina in the reactor. After the first gas has passed through the reactor, some of it remaining adsorbed on the activated alumina, the second gas is introduced into the air stream so that hydrazine is formed on the surface of the fine particles of activated alumina. The handling equipment and mixing, timing and control valves, and the sealing and separating devices are representative of the types employed in well-known gas-solids handling systems such as the catalytic cracking systems of the petroleum industry, for example.

The following examples illustrate the formation of hydrazine by alumina activation. The conditions and details of procedure are not intended to be representative of larger scale methods of handling.

Example I

Dry ammonia gas was passed over a bed of activated alumina until the heat of adsorption had been dissipated and the alumina was approximately at room temperature. Excess ammonia gas was displaced by passing dry nitrogen over the adsorbent and then chlorine gas diluted with nitrogen was introduced. Heat was evolved. The excess chlorine was destroyed by the passage of additional ammonia gas over the activated alumina. Hydrazine was extracted from the adsorbent by washing with water in good yield.

Example II

Diluted chlorine gas was passed over activated alumina and then ammonia gas was passed over the same treated adsorbent. On extraction of the adsorbent with water, a good yield of hydrazine was obtained.

Example III

Activated alumina was chlorinated by the passage of chlorine gas and subsequently ammoniated by the passage of ammonia gas. The latter was introduced at a low rate in order to control the temperature of the adsorbent. Portions of the treated alumina were extracted with water, dilute sodium hydroxide and ammonium hydroxide. Hydrazine was found in each of the three extracts.

The process herein disclosed is to be distinguished from the process of my copending application Serial No. 155,121, filed April 10, 1950, in which I describe and claim the production of hydrazine by the reaction of chlorine gas and more than four volumes of ammonia gas per volume of chlorine to produce ammonium chloride and a gas stream of chloramine and ammonia. The gas stream so produced is separated from the solid ammonium chloride and then passed in contact with activated alumina to produce hydrazine which may be separated from the alumina, such as by desorption.

I claim:

1. The method of manufacturing hydrazine which comprises reacting chlorine and ammonia in the presence of activated alumina by alternately contacting the alumina with each reactant and recovering the product from the alumina by desorption.

2. The method of manufacturing hydrazine which comprises reacting chlorine and ammonia in the presence of activated alumina by alternately contacting the alumina with each reactant, washing the alumina with an aqueous medium and recovering hydrazine from the wash liquor.

3. The method of manufacturing hydrazine which comprises reacting chlorine and ammonia in the presence of activated alumina by alternately contacting the alumina with each reactant, desorbing the product from the alumina by displacement with ammonia and recovering hydrazine from the resulting ammonia admixture.

References Cited in the file of this patent

FOREIGN PATENTS

| Number | Country | Date |
|---|---|---|
| 22,957 | Great Britain | 1907 |

OTHER REFERENCES

J. W. Mellor's "Comprehensive Treatise on Inorganic and Theoretical Chemistry," vol. 8, 1928 ed., pages 309, 310. Longmans, Green & Co., N. Y., publishers.